Patented May 13, 1924.

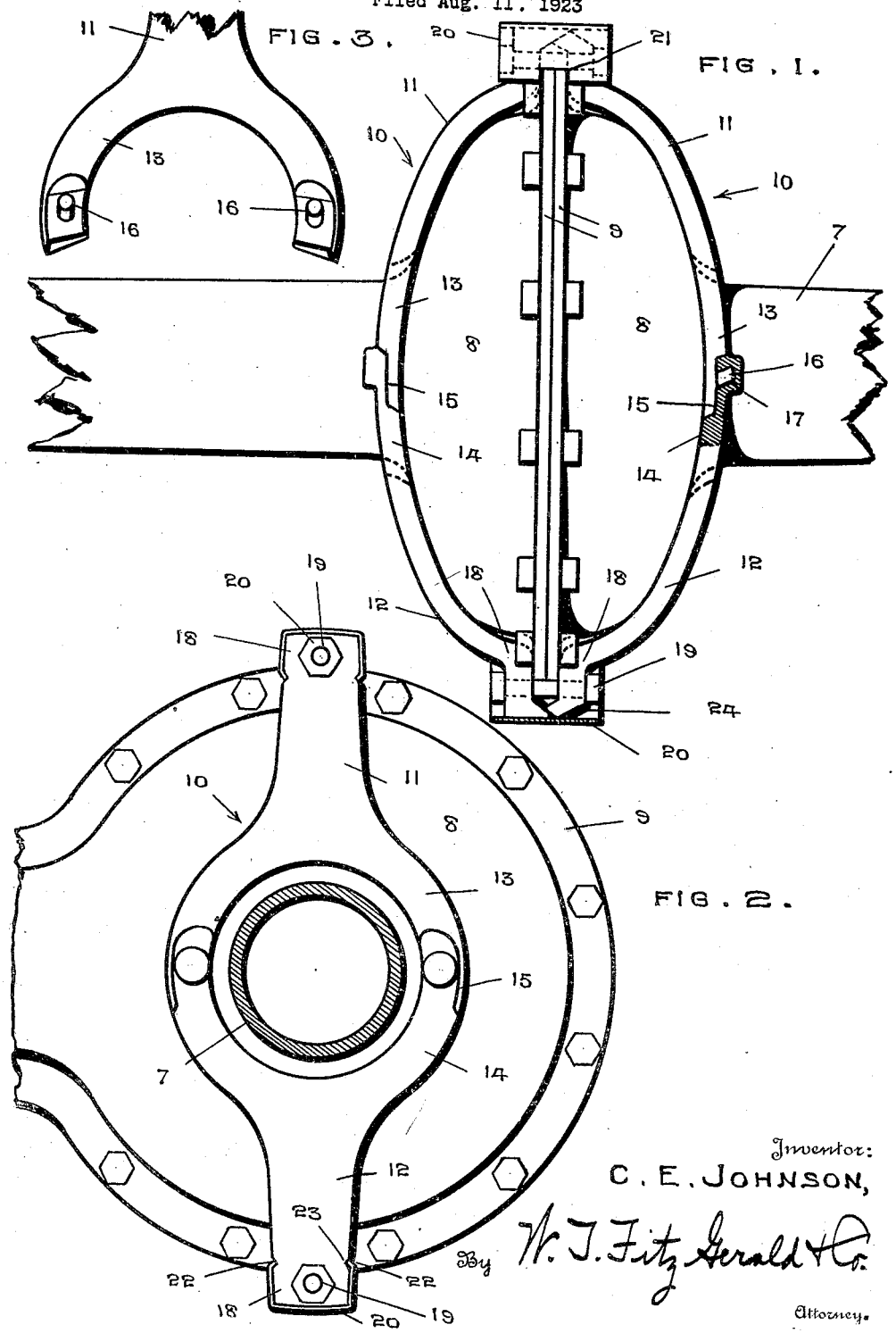

1,493,546

UNITED STATES PATENT OFFICE.

CHARLES E. JOHNSON, OF DAYTON, OHIO, ASSIGNOR OF ONE-HALF TO JAMES O. FERGUS, OF DAYTON, OHIO.

REAR-AXLE-HOUSING CLAMP.

Application filed August 11, 1923. Serial No. 656,849.

*To all whom it may concern:*

Be it known that I, CHARLES E. JOHNSON, a citizen of the United States, residing at Dayton, in the county of Montgomery and State of Ohio, have invented certain new and useful Improvements in Rear-Axle-Housing Clamps; and I do hereby declare the following to be a full, clear, and exact description of the invention, such as will enable others skilled in the art to which it appertains to make and use the same.

The present invention relates to a clamp for a rear axle housing of an automobile, for use in the event that the differential housing becomes fractured or weakened, and the primary object of the invention is to provide a novel and improved device for embracing the differential housing and holding same intact, so as to eliminate the necessity for replacing the housing.

Another object of the invention is the provision of such a clamp which can be conveniently placed on the housing and secured thereto, and which will clamp the parts of the housing together tightly.

With the foregoing and other objects in view, which will be apparent as the description proceeds, the invention resides in the construction and arrangement of parts as hereinafter described and claimed, it being understood that changes can be made within the scope of what is claimed, without departing from the spirit of the invention.

The invention is illustrated in the accompanying drawing, wherein—

Figure 1 is a rear view of the clamp on the housing, portions being shown in section.

Fig. 2 is a side elevation of the device, showing the axle housing in cross section.

Fig. 3 is a fragmentary elevation of a part of the clamp.

In the drawing there is illustrated a conventional rear axle housing 7 of an automobile provided between its ends with a differential housing composed of the sections 8 having the flanges 9 at their adjacent edges secured together by bolts.

It sometimes happens that the differential housing will become fractured or weakened, requiring the housing to be replaced, which involves the expense of a new housing and the installation thereof.

In carrying out the invention, the clamp is designed to embrace the differential housing for holding the parts thereof together and intact, even though the housing is fractured or weakened, so as to eliminate the expense of replacing the housing.

The device comprises arcuate yokes 10 to be disposed at the opposite sides of the differential housing and preferably shaped so as to conform to the shape of the sections 8 of the housing. Each yoke comprises the upper and lower sections 11 and 12 having forks or bifurcated portions 13 and 14, respectively, at their adjacent ends. The branches or arms of the forks 13 and 14 are overlapped, as at 15, at their adjacent ends, and the forks are of arcuate form, so that they jointly form a ring when the sections 11 and 12 are assembled, in order that the yoke may have a ring between its ends to surround the axle housing 7. The ring of each yoke is split or divided for convenience in placing the yoke around and removing it from the axle housing, and the sections 11 and 12 of each yoke are provided with a detachable connection for conveniently assembling and separating them. Thus, the end portions of the fork 13 of the upper section 11 of each yoke have outstanding inclined studs or tenons 16, and the end portions of the fork 14 of the lower section 12 have inclined sockets or recesses 17 for receiving said studs when the sections 11 and 12 are moved together diagonally relatively to one another. The studs 16 and sockets 17 being disposed obliquely of the yoke will serve to lock the sections together against lateral separation when the sections are under tensile strain, or under a strain tending to separate the sections, the studs 16 serving as "hooks" over which the end portions of the fork 14 are engaged.

The ends of the two yokes 10 are offset toward one another, as at 18, to be disposed at the opposite sides of the flanges 9 of the housing, and clamping bolts 19 extend through said end portions of the yoke for drawing the ends of the yokes toward one another and clamping the yokes under pressure against the sections 8 of the housing.

In order to protect the ends of the clamp from oil, dirt and other foreign matter, sheet metal covers 20 are provided, which are of U-shaped section so as to fit astride the ends of the yokes 10 transversely of the flanges 9, the flanges of the covers 20 having notches 21 to receive said flanges 9. The covers fit the ends of the yokes closely, so as to exclude dirt and foreign matter from between the ends of the yokes, and the edges of the flanges of the covers are bent inwardly, as at 22, to frictionally engage the edges of the yokes 10, whereby to retain the covers in place. The covers are resilient so as to grip the yokes, and it is preferable to provide the yokes with notches or grooves 23 in their edges to receive the edges 22 of the covers.

The ends of the yokes are also preferably bevelled, as at 24, so as to fit snugly together when the yokes are drawn together as closely as possible.

The present device enables a cheap repair job to be made when the differential housing is fractured or weakened, instead of requiring the expense of a new housing. The sections of the yokes 10 are readily assembled around the axle housing 7 by "hooking" the forks 13 and 14 together. The bolts 19 are then inserted and tightened, which will spring the ends of the yokes toward one another and urge the yokes under pressure against the housing sections 8, whereby the clamp embraces the differential housing and holds the sections thereof tightly together. The covers 20 are then applied to the ends of the clamp. The interengaging portions of the sections of the yokes are such that the tendency for the sections to pull apart will only result in holding the sections together more tightly.

Having thus described the invention, what is claimed as new is:—

1. A differential housing clamp comprising yokes having rings between their ends to surround the axle housing, and means for connecting the end portions of the yokes to clamp them against the differential housing.

2. A differential housing clamp comprising yokes having split rings between their ends to surround the axle housing, and means for connecting the end portions of the yokes to clamp them against the differential housing.

3. A differential housing clamp comprising yokes and means for connecting the yokes to clamp them to the opposite sides of a differential housing, each yoke being composed of sections having forks at their adjacent ends to surround the axle housing, said forks having means for attaching them together around the axle housing.

4. A differential housing clamp comprising a pair of yokes and means for connecting the end portions of the yokes to clamp the yokes against the opposite sides of a differential housing, each yoke comprising a pair of sections having forks at their adjacent ends to surround the axle housing, and the forks of each yoke having portions to interengage for locking the sections against separation when under tensile strain.

5. A differential housing clamp comprising a pair of yokes and means for connecting the yokes for clamping them against the opposite sides of a differential housing, each yoke comprising a pair of sections having forks at their adjacent ends to surround the axle housing, the forks of each yoke having a detachable connection including oblique studs carried by some arms of the yokes and oblique sockets in the other arms of the forks to receive said studs.

6. A differential housing clamp comprising a pair of yokes and means for connecting the end portions of the yokes to clamp the yokes against the opposite sides of the housing, each yoke comprising a pair of sections having forks at their adjacent ends to surround the axle housing, the end portions of the forks of each yoke being arranged to overlap and said overlapping end portions having means to interengage to prevent the sections from separating when under tensile strain.

7. A differential housing clamp comprising a pair of yokes, means for connecting the end portions of the yokes to clamp the yokes against the opposite sides of the housing, and U-shaped covers to fit over the end portions of the yokes having notches to receive the flanges of the housing.

In testimony whereof I have signed my name to this specification in the presence of two subscribing witnesses.

CHARLES E. JOHNSON.

Witnesses:
 THOMAS C. DUNN,
 ROSE M. DUNN.